US008090790B2

(12) United States Patent
Bestler (10) Patent No.: US 8,090,790 B2
(45) Date of Patent: Jan. 3, 2012

(54) METHOD AND SYSTEM FOR SPLICING REMOTE DIRECT MEMORY ACCESS (RDMA) TRANSACTIONS IN AN RDMA-AWARE SYSTEM

(75) Inventor: Caitlin Bestler, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 604 days.

(21) Appl. No.: 11/941,275

(22) Filed: Nov. 16, 2007

(65) Prior Publication Data

US 2008/0301254 A1 Dec. 4, 2008

Related U.S. Application Data

(60) Provisional application No. 60/940,808, filed on May 30, 2007.

(51) Int. Cl.
*G06F 15/167* (2006.01)
*G06F 13/28* (2006.01)
*G06F 15/16* (2006.01)

(52) U.S. Cl. .......... 709/212; 709/216; 709/206; 710/22; 710/26; 711/112; 711/114

(58) Field of Classification Search .......... 709/212–219, 709/206; 711/203, 213, 6, 112, 114, 207–209, 711/147–150; 710/22, 26, 308
See application file for complete search history.

(56) References Cited

U.S. PATENT DOCUMENTS

| | | | | |
|---|---|---|---|---|
| 6,594,712 B1 * | 7/2003 | Pettey et al. | ..................... | 710/22 |
| 6,647,423 B2 * | 11/2003 | Regnier et al. | ................. | 709/229 |
| 7,012,918 B2 * | 3/2006 | Williams | ...................... | 370/389 |
| 7,376,755 B2 * | 5/2008 | Pandya | .......................... | 709/250 |
| 7,480,298 B2 * | 1/2009 | Blackmore et al. | ........... | 370/392 |
| 7,565,454 B2 * | 7/2009 | Zuberi | .......................... | 709/250 |
| 7,577,707 B2 * | 8/2009 | Hufferd et al. | ................ | 709/206 |
| 7,849,232 B2 * | 12/2010 | Sharp et al. | ....................... | 710/8 |
| 2004/0073622 A1 * | 4/2004 | McDaniel et al. | ............ | 709/212 |
| 2005/0149817 A1 * | 7/2005 | Biran et al. | ..................... | 714/758 |
| 2005/0223118 A1 * | 10/2005 | Tucker et al. | ................. | 709/250 |
| 2006/0236063 A1 * | 10/2006 | Hausauer et al. | ............. | 711/170 |
| 2007/0208820 A1 * | 9/2007 | Makhervaks et al. | ......... | 709/212 |

OTHER PUBLICATIONS

Chadalapaka, M. et al, "A Study of iSCSI Extensions for RDMA (iSER)", Aug. 2003, ACM, pp. 209-219.*
Callaghan, B., et al, "NFD over RDMA", Aug. 2003, ACM, pp. 196-208.*
Hilland et al, "RDMA Protocol Verbs Specification (Version 1.0)", Apr. 2003, draft-hilland-iwarp-verbs-v1.0, pp. 1-243.*

* cited by examiner

*Primary Examiner* — Gregory Todd
(74) *Attorney, Agent, or Firm* — McAndrews, Held & Malloy, Ltd.

(57) ABSTRACT

Aspects of a system for splicing RDMA transactions in an RDMA system may include a main processor within a main server that may receive read requests from a client device. The main processor may translate a data reference contained in each read request to generate a physical buffer list (PBL). The processor 206 may communicate the PBL to a local processor within a NIC. The local processor may utilize the PBL perform RDMA operations to retrieve data stripes contained in one or more DDP segments received from a plurality of auxiliary servers. The local processor may enable the generation of TCP packets each containing the data stripes, which may then be sent to the client. The retrieval of DDP segments and generation of TCP packets may occur within the NIC without transferring retrieved data stripes via a system bus within the main server.

33 Claims, 7 Drawing Sheets

FIG. 4 ptimizations # METHOD AND SYSTEM FOR SPLICING REMOTE DIRECT MEMORY ACCESS (RDMA) TRANSACTIONS IN AN RDMA-AWARE SYSTEM

CROSS-REFERENCE TO RELATED APPLICATIONS/INCORPORATION BY REFERENCE

This application makes reference to, claims priority to, and claims the benefit of U.S. Provisional Application Ser. No. 60/940,808, filed May 30, 2007, which is hereby incorporated herein by reference in its entirety.

This application makes reference to U.S. application Ser. No. 11/269,422 filed on Nov. 8, 2005, which is hereby incorporated herein by reference.

FIELD OF THE INVENTION

Certain embodiments of the invention relate to data communications. More specifically, certain embodiments of the invention relate to a method and system for splicing remote direct memory access (RDMA) transactions in an RDMA-aware system.

BACKGROUND OF THE INVENTION

In conventional computing, a single computer system is often utilized to perform operations on data. The operations may be performed by a single processor, or central processing unit (CPU) within the computer. The operations performed on the data may include numerical calculations, or database access, for example. The CPU may perform the operations under the control of a stored program containing executable code. The code may include a series of instructions that may be executed by the CPU that cause the computer to perform the operations on the data. The capability of a computer in performing these operations may be measured in units of millions of instructions per second (MIPS), or millions of operations per second (MOPS).

Historically, increases in computer performance have depended on improvements in integrated circuit technology, and were often governed by the principles of "Moore's law". Moore's law postulates that the speed of integrated circuit devices may increase at a predictable, and approximately constant, rate over time. However, technology limitations may begin to limit the ability to maintain predictable speed improvements in integrated circuit devices.

Another approach to increasing computer performance implements changes in computer architecture. For example, the introduction of parallel processing may be utilized. In a parallel processing approach, computer systems may utilize a plurality of CPUs within a computer system that may work together to perform operations on data. Parallel processing computers may offer computing performance that may increase as the number of parallel processing CPUs in increased. The size and expense of parallel processing computer systems result in special purpose computer systems. This may limit the range of applications in which the systems may be feasibly or economically utilized.

An alternative to large parallel processing computer systems is cluster computing. In cluster computing, a plurality of smaller computer, connected via a network, may work together to perform operations on data. Cluster computing systems may be implemented, for example, utilizing relatively low cost, general purpose, personal computers or servers. In a cluster computing environment, computers in the cluster may exchange information across a network similar to the way that parallel processing CPUs exchange information across an internal bus. Cluster computing systems may also scale to include networked supercomputers. The collaborative arrangement of computers working cooperatively to perform operations on data may be referred to as high performance computing (HPC).

Cluster computing offers the promise of systems with greatly increased computing performance relative to single processor computers by enabling a plurality of processors distributed across a network to work cooperatively to solve computationally intensive computing problems. One aspect of cooperation between computers may include the sharing of information among computers. Remote direct memory access (RDMA) is a method that enables a processor in a local computer to gain direct access to memory in a remote computer across the network. RDMA may provide improved information transfer performance when compared to traditional communications protocols. RDMA has been deployed in local area network (LAN) environments some of which have been standardized and others which are proprietary. RDMA, when utilized in wide area network (WAN) and Internet environments, is referred to as RDMA over TCP, RDMA over IP, or RDMA over TCP/IP.

In a system utilizing storage area network (SAN) technology, data from a file may be distributed among a plurality of physical and/or logical storage devices, for example. A portion of the file, which is stored in a physical or logical storage device, may be referred to as a "data stripe". A client device, which may be communicatively coupled to an SAN device, may store files and/or data in, or retrieve files and/or data from, the SAN device. An exemplary client device may comprise a personal computer, or workstation. The SAN device may comprise a server device, which may receive files and/or data from the client device, segment the received files and/or data into data stripes, and store each data stripe in at least one of the physical and/or logical storage devices within the SAN device. The server device may also retrieve files and/or data in response to a request from the client device. In this aspect, the server device may retrieve a plurality of data stripes, which may be assembled to reconstitute the retrieved file.

In some conventional SAN systems, the server may retrieve and store each of the retrieved data stripes until the retrieved file has been reconstituted. The reconstituted file may then be transmitted, by the server, to the requesting client device, via a network. One disadvantage in this approach is that the server may be required to allocate physical storage resources, for example memory, which may be utilized to store data stripes until a sufficient number of data stripes have been retrieved to reconstitute the retrieved file.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for splicing remote direct memory access (RDMA) transactions in an RDMA-aware system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for splicing remote direct memory access (RDMA) transactions in an RDMA-aware system. In various embodiments of the invention, a client device may request data from a main server device. The request may be communicated using various protocols, for example, the transmission control protocol (TCP), user datagram protocol (UDP) or various streaming media protocols. The request may contain a data reference, such as a file handle, that may enable the referenced data to be retrieved from storage and sent to the client. A network interface controller (NIC) within the main server device may receive the request via a network. The NIC may forward the request to request to a central processor unit (CPU) within the main server device via an internal system bus. The CPU may translate the data reference contained in the request into a physical buffer list (PBL). The PBL may contain reference to RDMA memory regions at which portions of the requested data, or "data stripes", may be stored. Each of the data stripes may be stored in at least one of a plurality of auxiliary server devices. In various embodiments of the invention, the main server device and auxiliary server devices may form a storage area network (SAN).

The CPU within the main server device may communicate the PBL to the NIC within the main server device via the internal system bus. The NIC may utilize the PBL to retrieve each of the individual data stripes, which may be stored among the plurality of auxiliary storage devices. The NIC may communicate received data stripes to the client device by sending one or more segments to the client device. The first segment sent from the NIC to the client device may contain the first portion of the requested data, the second segment may contain the second portion of the requested data and so forth.

Figure 1A:
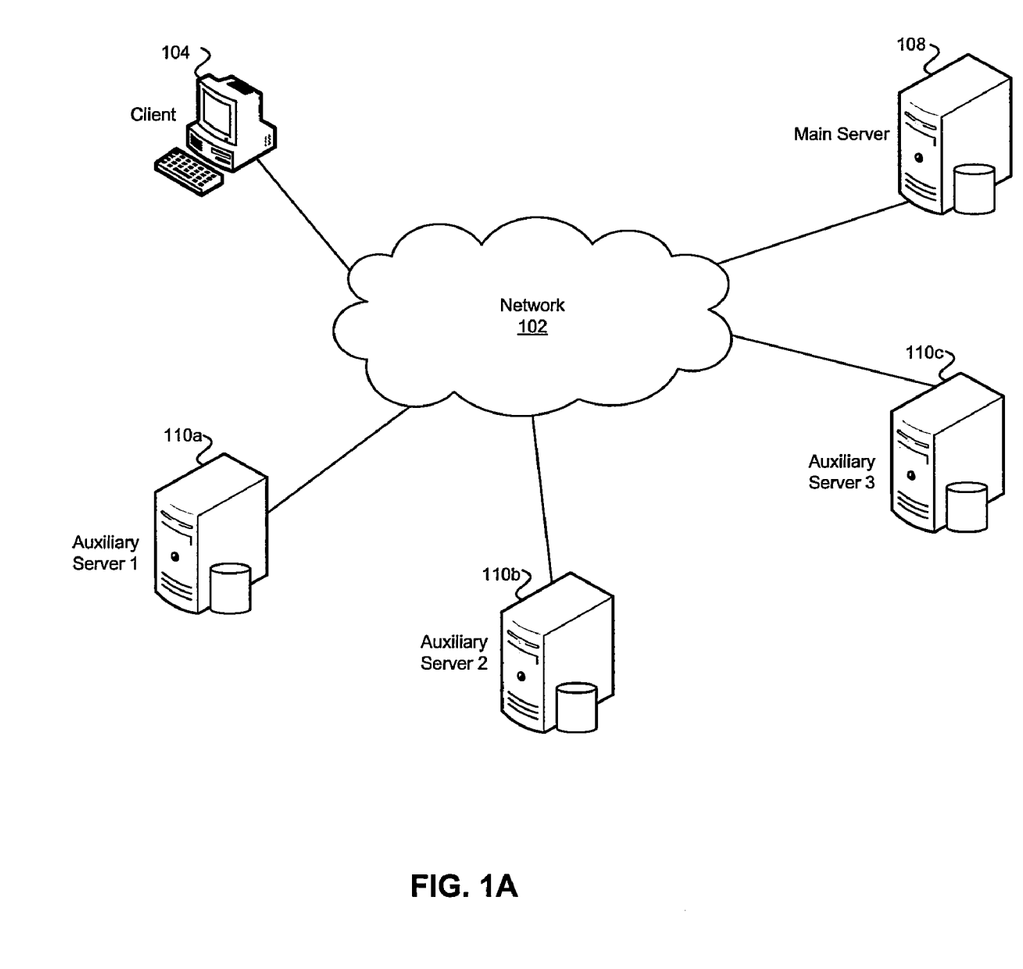
FIG. 1A illustrates an exemplary system for a storage area network (SAN), which may be utilized in connection with an embodiment of the invention.

FIG. 1A illustrates an exemplary system for a storage area network (SAN), which may be utilized in connection with an embodiment of the invention. Referring to FIG. 1A, there is shown a network 102, a client device 104, main server 108, and a plurality of auxiliary servers 110a, 110b, and 110c. The client device 104, main server 108, and plurality of auxiliary servers 110a, 110b, and 110c may be communicatively coupled via the network 102. The main server 108, and auxiliary servers 110a, 110b, and 110c may be utilized as components in an SAN device. The client device 104, which may also be referred to as a client, may utilize any of a plurality of upper layer protocols (ULP), for example file sharing protocols, for requesting retrieval and/or storage of files and/or data within the SAN device. Exemplary file sharing protocols may comprise the network file system (NFS), the NetWare core protocol (NCP), the Apple filing protocol (AFP), the common Internet file system (CIFS), server message block (SMB), and Samba.

In a system for RDMA, each of the auxiliary servers 110a, 110b, and 110c may advertise buffers to the main server 108. Alternatively, each of buffers within each of the auxiliary servers 110a, 110b, and 110c may be constructed based on instructions received from the main server 108. Each of the buffers may be accessed based on a corresponding steering tag (STag). In an SAN system utilizing data striping, the buffers may be utilized collectively, or in part, to store data stripes associated with a data file. Based on the buffer advertisements, the main server 108 may generate an aggregated STag, Agg_STag, which defines an aggregated memory region. The aggregated memory region, referred to as a physical buffer list (PBL), may represent a logical memory region that is formed by aggregating physical memory regions that were individually defined by buffer advertisements from the auxiliary servers. An individual physical memory region that may be a part of the aggregated memory region may be referenced by a physical buffer list entry (PBLE) within the PBL. Each PBLE may be referenced by a page, or block, offset within a virtual address range.

The PBL may correlate the STags received from individual auxiliary servers to an aggregated STag, Agg_STag. The Agg_STag may be utilized with an aggregated offset value, Agg_TO, to select one of the advertised buffers. The PBL, Agg_STag, and Agg_TO information may be generated by the main server 108.

The retrieval of large data files by DMA transfer for transmission to the client device 104 may consume substantial bandwidth resources on a system bus within the main server 108. The extent of bandwidth resource utilization may interfere with the performance and/or execution of other tasks that also utilize the system bus. In various embodiments of the invention, RDMA may be utilized to allow a NIC within the main server 108 to retrieve data stripes from individual auxiliary servers 110a, 110b and/or 110c and send the retrieved data stripes to the client device 104 via the network 102 without having to transmit the data across the system bus within the main server. Consequently, various embodiments of the invention may enable more efficient utilization of bandwidth resources in comparison to some conventional systems, which may transfer retrieved data stripes to main memory within the main server 108 and subsequently transfer the data stripes from main memory to the NIC via the internal system bus.

In various embodiments of the invention, the main server 108 may receive a request for a data file from the client 104. The request may comprise a file handle associated with the data file. The main server 108 may associate the file handle with a referenced Agg_STag. The main server 108 may utilize the PBL for the referenced Agg_STag to locate each of the data stripes contained within the data file. For example, the data file may comprise 3 data stripes: an $STag_1$ may refer to a first data stripe, which may be stored in the auxiliary server 110a, an $STag_2$ may refer to a second data stripe, which may be stored in the auxiliary server 110$b$, and an STag$_3$ may refer to a third data stripe and may be stored in the auxiliary server 110$c$. The main server 108 may utilize the PBL to generate the list of STags comprising STag$_1$, STag$_2$, and STag$_3$ based on the Agg_STag. The Agg_STag may be utilized for splicing data stripes 1, 2, and 3 into a single data file. In this regard, the Agg_STag may be referred to as a splitter STag. The main server 108 may utilize the STag$_1$ to retrieve data stripe 1 from the auxiliary server 110$a$, for example.

Each data stripe may be retrieved from an auxiliary server in one or more tagged Direct Data Placement (DDP) segments. Upon retrieval of one or more DDP segments, the main server 108 may forward data contained within the tagged DDP segment to the client device 104. The data may be forwarded to the client device 104 in a sequence of packets. Based on the sequence number in which the packets are received, the client device 104 may store the received data to at one or more physical memory locations within the client device 104. For example, data contained a first received packet, may be stored at one or more physical memory locations utilized for storage of a first portion of the data requested by the client device 104. A succeeding received packet may be stored at a one or more physical memory locations utilized for storage of the succeeding portion of the data requested by the client device 104. The main server 108 may receive one or more DDP segments and forward a current packet to the client device 104 without waiting for receipt of DDP segments from the auxiliary servers that may be contained in a subsequent packet.

Various embodiments of the invention may not be limited to SAN systems, or systems that utilize disk storage technologies, such as magnetic and/or optical disk storage. The invention may also be practiced when the physical memory resources reference any of a plurality of storage technologies. For example, various embodiments of the invention may be practiced when the physical memory comprises any of a plurality of storage medium technologies such as volatile memory, for example random access memory (RAM), and/or nonvolatile memory, for example electrically erasable programmable read only memory (EEPROM). In this regard, an Agg_STag and Agg_TO may refer to a physical memory resource within one or more RAM devices, for example.

Figure 1B:
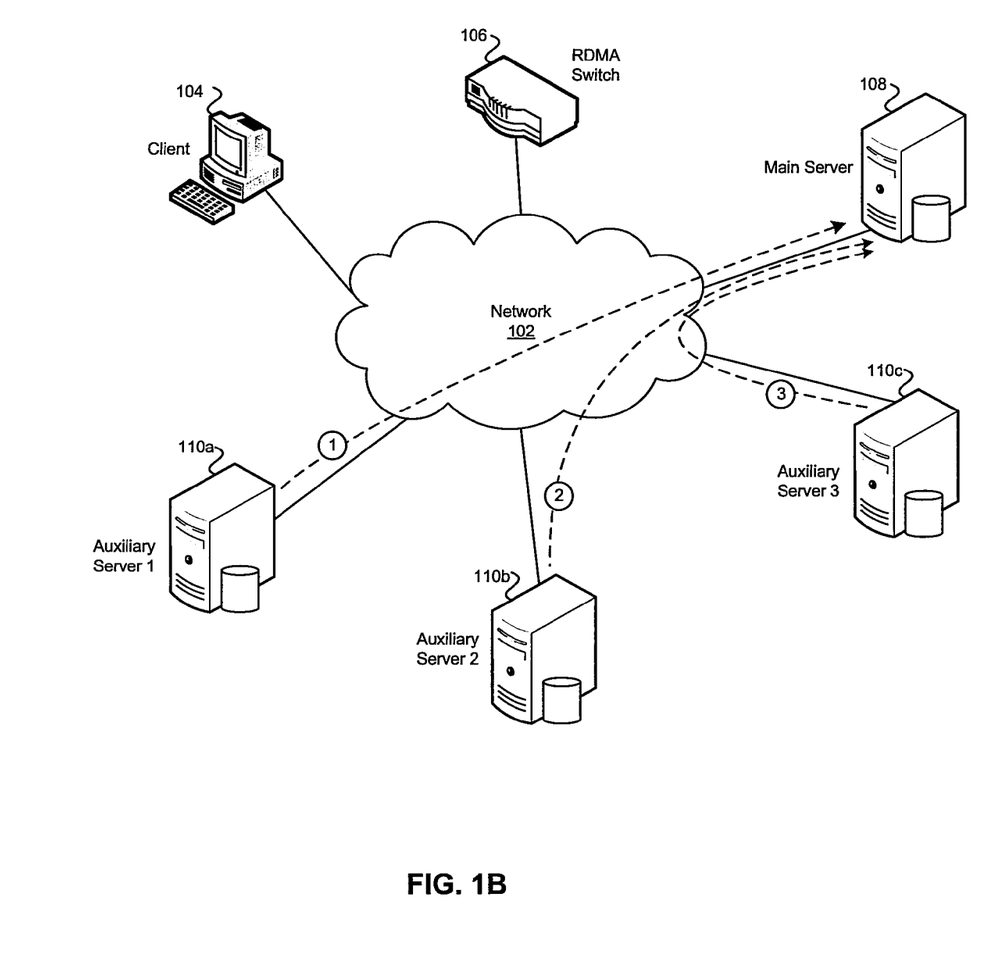
FIG. 1B illustrates exemplary message flows for advertising buffers in an RDMA-aware system, in accordance with an embodiment of the invention.

FIG. 1B illustrates exemplary message flows for advertising buffers in an RDMA-aware system, in accordance with an embodiment of the invention. FIG. 1B shows components that have been previously described in FIG. 1A. Referring to FIG. 1B, there is shown a network 102, a client device 104, a main server 108, and a plurality of auxiliary servers 110$a$, 110$b$, and 110$c$.

The auxiliary server 110$a$ may advertise buffers that may be utilized in an RDMA transaction by communicating the buffer advertisement to the main server 108 as illustrated in the reference label 1. The buffer advertisement may comprise a steering tag STag$_1$, a buffer offset TO$_1$, and a length, Length$_1$. The STag$_1$ may identify a block of physical memory resources within the auxiliary server 110$a$, which may be utilized for storage and retrieval of files and/or data. The buffer offset TO$_1$ may be utilized to identify a location within the buffer. The length Length$_1$ may be utilized to identify a quantity of physical memory resources, which may be made available within the advertised buffer.

The auxiliary server 110$b$ may advertise buffers that may be utilized in an RDMA transaction by communicating the buffer advertisement to the main server 108 as illustrated in the reference label 2. The buffer advertisement may comprise a steering tag STag$_2$, a buffer offset TO$_2$, and a length, Length$_2$. The STag$_2$ may identify a block of physical memory resources within the auxiliary server 110$b$, which may be utilized for storage and retrieval of files and/or data. The buffer offset TO$_2$ may be utilized to identify a location within the buffer. The length Length$_2$ may be utilized to identify a quantity of physical memory resources, which may be made available within the advertised buffer.

The auxiliary server 110$c$ may advertise buffers that may be utilized in an RDMA transaction by communicating the buffer advertisement to the main server 108 as illustrated in the reference label 3. The buffer advertisement may comprise a steering tag STag$_3$, a buffer offset TO$_3$, and a length, Length$_3$. The STag$_3$ may identify a block of physical memory resources within the auxiliary server 110$c$, which may be utilized for storage and retrieval of files and/or data. The buffer offset TO$_3$ may be utilized to identify a location within the buffer. The length Length$_1$ may be utilized to identify a quantity of physical memory resources, which may be advertised in the buffer advertisement.

The main server 108 may receive buffer advertisements as illustrated in reference labels 1, 2, and 3 and compile a physical buffer list (PBL). The PBL may logically group the buffers referenced by the steering tags STag$_1$, STag$_2$, and STag$_3$, respectively, such that an aggregated steering tag SSTag$_{Agg}$ may reference the resulting aggregated buffer. The aggregated buffer may be a logical entity that references physical memory resources identified by the individual steering tags that are represented by PBLEs. The buffer offset TO$_{Agg}$ may identify a location within the aggregated buffer. The length Length$_{Agg}$ may indicate an aggregated quantity of physical memory resources referenced by the aggregated buffer. The aggregated quantity of physical memory resources may be equal to the sum of the individual physical memory resources referenced by each of the PBLEs.

For RDMA transactions that involve storage of files and/or data from the client device 104 to the aggregated buffer, the steering tag SSTag$_{Agg}$ may represent a splitting STag. A splitting STag may be utilized to enable data striping of files and/or data that are to be stored in an SAN device, for example. For RDMA transactions that involve retrieval of files and/or data, which may be stored in a data striping format in an SAN device, for example, the steering tag SSTag$_{Agg}$ may represent a splicing STag. The splicing STag may be utilized to enable individually retrieved data stripes to be ordered such that the files and/or data may be reconstructed from the retrieved data stripes.

Figure 1C:
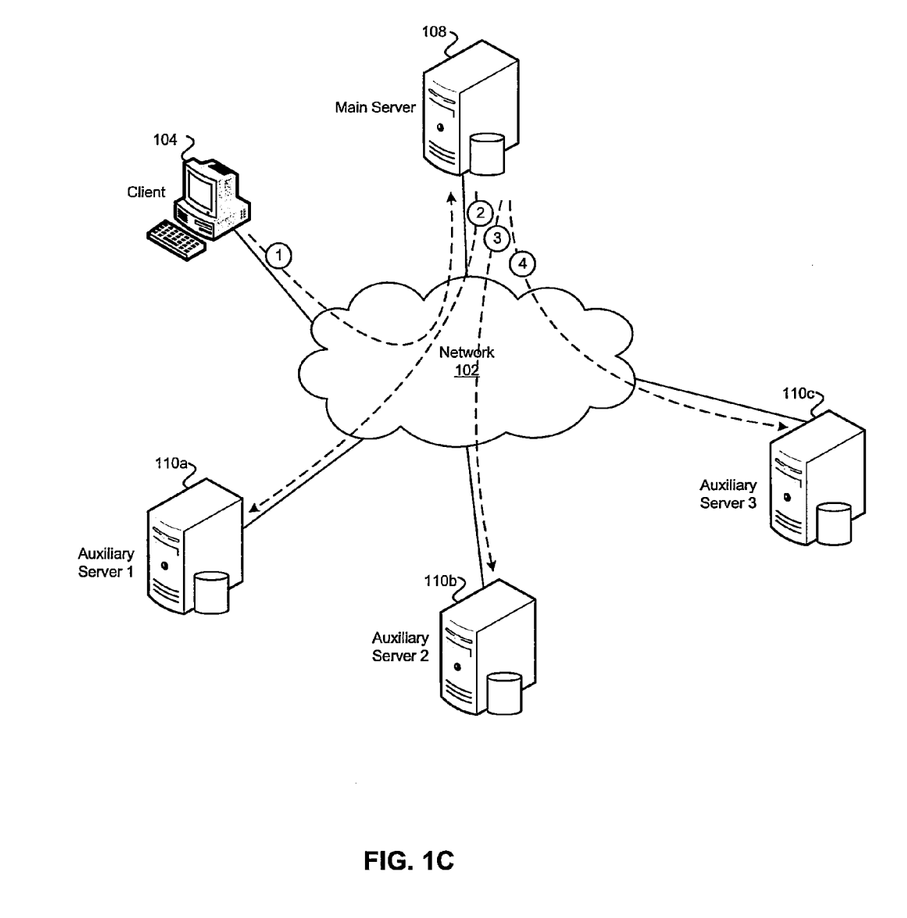
FIG. 1C illustrates exemplary data striping in an RDMA-aware system, in accordance with an embodiment of the invention.

FIG. 1C illustrates exemplary data striping in an RDMA-aware system, in accordance with an embodiment of the invention. FIG. 1C shows components that were previously described in FIG. 1A. Referring to FIG. 1C, there is shown a network 102, a client device 104, a main server 108, and a plurality of auxiliary servers 110$a$, 110$b$, and 110$c$.

The client device 104 may initiate a write request to request that a file be stored at one or more locations within an SAN device, for example, as illustrated by the reference label 1. The write request may originate from an upper layer protocol (ULP) executing within the client device 104. The write request may be sent to the main server 108. The write request may identify the file based on a file handle, an offset value, and a length, for example. The file handle may identify a logical memory region within the SAN device in which the file is to be stored. The offset may identify a logical address that represents a starting address in which the file is to be stored within the logical memory region. The length may identify a quantity of physical memory that is to be allocated within the SAN device for the storage of data contained in the file.

The client device 104 may send the data contained in the file to the main server 108 in one or more packets, for example TCP packets. Each packet may comprise a TCP segment where a TCP segment may comprise at least a portion of the data contained within the file. The size of a TCP segment, as measured in bytes for example, and/or the number of TCP segments utilized to transmit the file to the main server 108 may be determined based on the size of the file, and/or the maximum segment size (MSS) parameter utilized for the TCP instances executing at the client device 104 and/or main server 108.

Upon receipt of a write request from the client device 104, the main server 108 may associate the file handle, offset, and length parameters, with a PBL as referenced by the splitting STag, $SSTag_{Agg}$. The PBL may indicate a plurality of steering tags associated with a corresponding plurality of buffers. Each of the buffers may represent physical memory resources located in at least one of a plurality of auxiliary servers 110a, 110b, and/or 110c. The plurality of steering tags may be utilized by the main server 108 to enable data striping of the file received from the client device 104 prior to storage of the data stripes to physical memory resources within at least one of the auxiliary servers 110a, 110b, and/or 110c.

Upon receipt of a TCP segment containing a data stripe 1 from the client device 104, the main server 108 may translate a sequence number, $SN_1$, contained in the corresponding TCP packet to generate a first DDP segment. The first DDP segment may comprise a steering tag that references a buffer that represents physical memory resources within one of the auxiliary servers, and a buffer offset that indicates a location within the buffer. For example, the DDP segment may comprise a steering tag $STag_1$, and buffer offset $TO_1$, which may refer to a physical memory resource location within the auxiliary server 110a. The main server 108 may transmit the DDP segment to the auxiliary server 110a by performing an RDMA write operation as illustrated by the reference label 2.

Upon receipt of a TCP segment containing a data stripe 2 from the client device 104, the main server 108 may translate a sequence number, $SN_2$, contained in the corresponding TCP packet to generate a second DDP segment. The second DDP segment may comprise a steering tag $STag_2$, and buffer offset $TO_2$, which may refer to a physical memory resource location within the auxiliary server 110b. The main server 108 may transmit the DDP segment to the auxiliary server 110b by performing an RDMA write operation as illustrated by the reference label 3.

Upon receipt of a TCP segment containing a data stripe 3 from the client device 104, the main server 108 may translate a sequence number, $SN_3$, contained in the corresponding TCP packet to generate a third DDP segment. The third DDP segment may comprise a steering tag $STag_3$, and buffer offset $TO_3$, which may refer to a physical memory resource location within the auxiliary server 110c. The main server 108 may transmit the DDP segment to the auxiliary server 110c by performing an RDMA write operation as illustrated by the reference label 4.

Figure 1D:
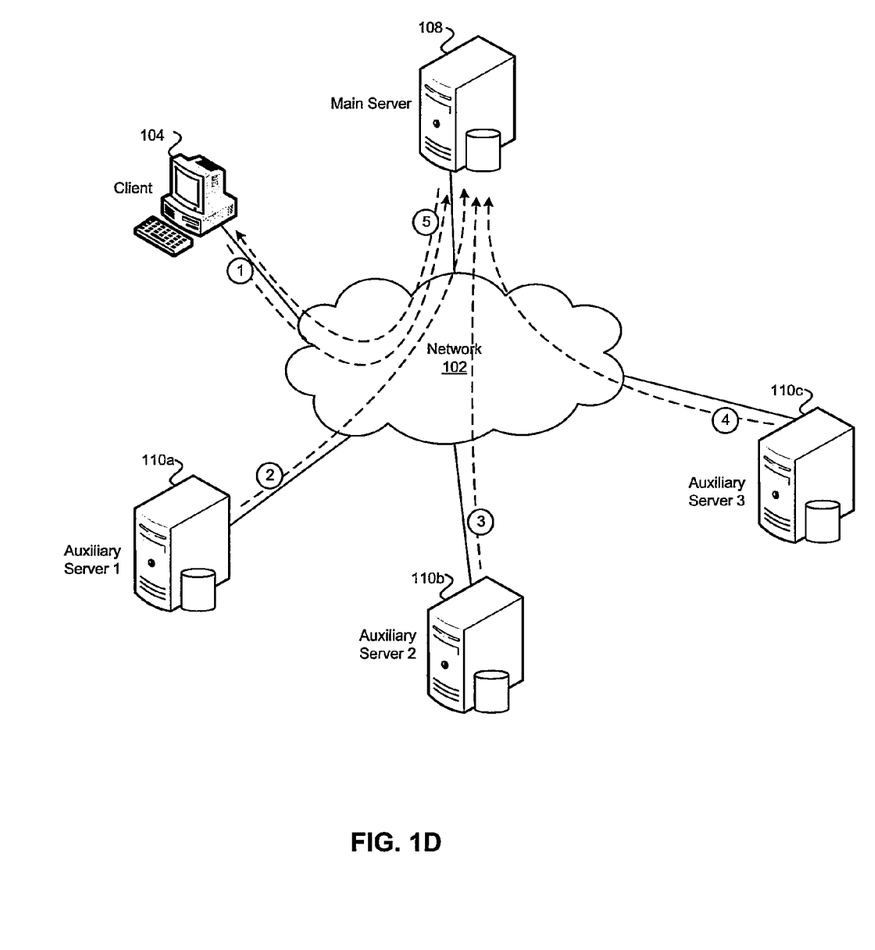
FIG. 1D illustrates exemplary splicing of data stripes in an RDMA-aware system, in accordance with an embodiment of the invention.

FIG. 1D illustrates exemplary splicing of data stripes in an RDMA-aware system, in accordance with an embodiment of the invention. FIG. 1D shows components that were previously described in FIG. 1A. Referring to FIG. 1D, there is shown a network 102, a client device 104, a main server 108, and a plurality of auxiliary servers 110a, 110b, and 110c.

The client device 104 may initiate a read request to request that a file be retrieved from one or more locations within an SAN device, for example, as illustrated by the reference label 1. The read request may be sent to the main server 108. The read request may originate from a ULP executing within the client device 104. The requested file and/or data may be distributed among a plurality of auxiliary servers 110a, 110b, and/or 110c, in a data striping format, for example. The client device 104 issuing the read request may not be aware that the requested file and/or data may be stored in data striping format, however. The read request may identify the file and/or data based on a file handle, an offset value, and a length. The file handle may identify a logical memory region within the SAN device in which the requested file and/or data is stored. The offset may identify an address within the logical memory region that represents a starting address in which the file is stored within the logical memory region. The length may identify a quantity of physical memory that is allocated within the SAN device for the storage of data contained in the file.

The main server 108 may associate the file handle, offset, and length parameters, with a PBL as referenced by the splicing STag, $SSTag_{Agg}$. The PBL may indicate a plurality of steering tags associated with a corresponding plurality of buffers. Each of the buffers may represent physical memory resources located in at least one of a plurality of auxiliary servers 110a, 110b, and/or 110c. The plurality of steering tags may be utilized by the main server 108 to enable splicing of data stripes retrieved from physical memory resources within at least one of the auxiliary servers 110a, 110b, and/or 110c and forwarding of the retrieved data stripes within sequence numbered packets sent to the client device 104. For example, the requested file may comprise a data stripe 1 stored in the auxiliary server 110a, a data stripe 2 stored in the auxiliary server 110b, and a data stripe 3 stored in the auxiliary server 110c. The physical memory resources utilized for storage of data stripe 1 may be referenced by a steering tag $STag_1$ and buffer offset $TO_1$. The physical memory resources utilized for storage of data stripe 2 may be referenced by a steering tag $STag_2$ and buffer offset $TO_2$. The physical memory resources utilized for storage of data stripe 3 may be referenced by a steering tag $STag_3$ and buffer offset $TO_3$.

The main server 108 may receive the data stripe 1 from the auxiliary server 1 as illustrated by the reference label 2. The data stripe may be contained in one or more DDP segments. The main server 108 may forward each portion of the data stripe 1 received in a DDP segment in a sequence numbered packet that is sent to the client device 104 as illustrated by the reference label 5. The main server 108 may generate a sequence numbered packet for each received DDP segment. Each sequence numbered packet may be sent to the client device 104 by the main server 108 without waiting for receipt of a subsequent DDP segment.

The main server 108 may receive the data stripe 2 from the auxiliary server 2 as illustrated by the reference label 3. The data stripe may be contained in one or more DDP segments. The main server 108 may forward each portion of the data stripe 2 received in a DDP segment in a sequence numbered packet that may be sent to the client device 104 as illustrated by the reference label 5.

The main server 108 may receive the data stripe 3 from the auxiliary server 3 as illustrated by the reference label 4. The data stripe may be contained in one or more DDP segments. The main server 108 may forward each portion of the data stripe 3 received in a DDP segment in a sequence numbered packet that may be sent to the client device 104 as illustrated by the reference label 5.

Figure 2:
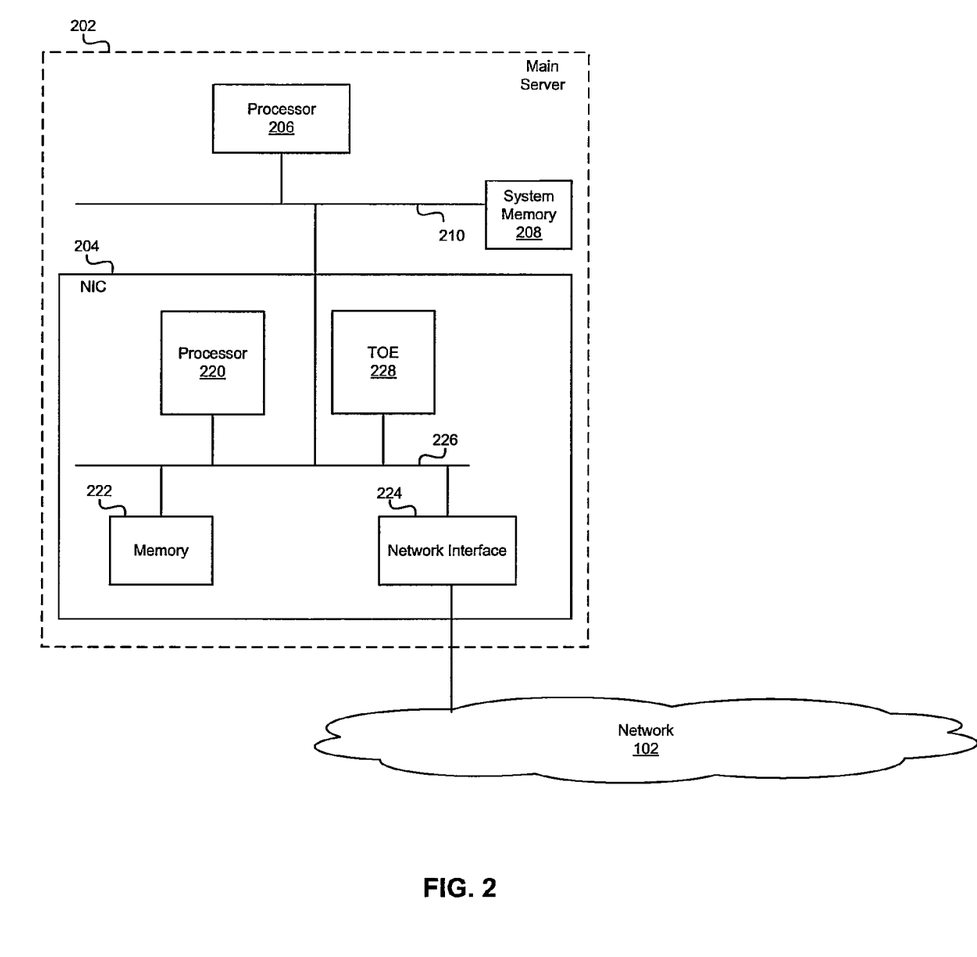
FIG. 2 is a block diagram of an exemplary RDMA-aware system, in accordance with an embodiment of the invention.

FIG. 2 is a block diagram of an exemplary RDMA-aware system, in accordance with an embodiment of the invention. Referring to FIG. 2, there is shown a network 102, and a main server 202. The main server 202 may comprise a network interface controller (NIC) 204, a processor 206, a system memory 208, and a system bus 210. The NIC 204 may comprise a processor 220, a TCP offload engine (TOE) 228, a memory 222, a network interface 224, and a local bus 226.

The processor 206 may comprise suitable logic, circuitry, and/or code that may be utilized to perform upper layer protocol (ULP) functions in connection with RDMA transactions. The processor 206 may be utilized to control the operation of the main server 202 and/or execute ULP code, for example code for NFC, NCP, AFP, CIFS SMB, and/or Samba. The processor 206 may be coupled to the system bus 210. The processor 206 may also process untagged DDP segments. The processor 206 may generate PBLs, based on ULP messages, to support RDMA transactions. An exemplary ULP message may comprise a buffer advertisement that was received via the network 102. The processor 206 may also perform ULP processing related to the subsequent utilization of PBLs to support RDMA transactions.

The system memory 208 may comprise suitable logic, circuitry, and/or code that may be utilized to store, or write, and/or retrieve, or read, information, data, and/or executable code. The system memory 208 may comprise a plurality of random access memory (RAM) technologies such as, for example, DRAM, and/or nonvolatile memory, for example electrically erasable programmable read only memory (EEPROM).

The NIC 204 may comprise suitable circuitry, logic and/or code that may enable the main server 202 to transmit and/or receive data from a network, for example, an Ethernet network. The NIC 204 may be coupled to the network 102 and to the bus 210. The NIC 204 may enable the main server 202 to receive DDP segments via the network 102, generate TCP packets each comprising at least one DDP segment by performing translations on at least a portion of the data contained in the received DDP segment. The generated TCP packets may subsequently be transmitted via the network 102. The NIC 204 may also enable the main server 202 to receive TCP packets via the network 102, generate DDP segments by performing translations on at least a portion of information contained within each received TCP packet, and subsequently transmit the generated DDP segments via the network 102. The NIC 204 may perform the translations on TCP packets and/or DDP segments based on information contained in a PBL.

The processor 220 may comprise suitable logic, circuitry, and/or code that may be utilized to perform DDP and/or RDMA protocol functions in connection with RDMA transactions as described above. The processor 220 may be coupled to the local bus 226. The local bus 226 may be coupled to the system bus 210.

The TOE 228 may comprise suitable logic, circuitry, and/ or code to perform protocol processing and/or provide reliable transmission and/or reception of DDP segments via the network 102. In various embodiments of the invention, the TOE 228 may utilize a protocol stack that comprises a plurality of protocols, for example TCP and/or IP.

The memory 222 may comprise suitable logic, circuitry, and/or code that may be utilized to store, or write, and/or retrieve, or read, information, data, and/or executable code. The memory 222 may be utilized for temporary storage of DDP segments that are being processed by the NIC 204, or for storage of information contained in an PBL, for example. The memory 222 may comprise a plurality of random access memory (RAM) technologies such as, for example, DRAM, and/or nonvolatile memory, for example electrically erasable programmable read only memory (EEPROM).

The network interface 224 may receive signals via the network 102. The signals may comprise one or more framing information bits indicating the start and/or end of received data. Between the start of the data and the end of the data, the received signals may comprise a representation of bits that are associated with the received data, for example. The received signals may be converted to a binary representation comprising bits based on detected electrical and/or optical signals, with associated timing parameters, signal amplitude, energy, and/or power levels as specified by an appropriate specification for a network medium, for example, Ethernet. The network interface 224 may subsequently transmit bits, for example bits associated with a DDP segment, via the local bus 226.

The network interface 224 may also transmit signals via the network 102. The signals may comprise electrical and/or optical signals that are generated based on binary representations of bits. The bits may be received via the local bus 226. The electrical and/or optical signals may be transmitted based on timing parameters, signal amplitudes, energy levels, and/ or power levels as specified by an appropriate specification for a network medium.

In operation, the client device 104 may initiate a read request that may be sent in a TCP packet, for example, via the network 102 to the main server 202. The read request may contain a data reference comprising a file handle, offset value and length, which refer to a file and/or data that are being requested by the client device 104. The network interface 224 within the NIC 204 may receive the read request via the network 102. The network interface 224 may send the read request to the processor 206 via the local bus 226 and the system bus 210. The processor 206 may generate a PBL based on the file handle, offset value and/or length, which may be contained within the received read request. The processor 206 may then send the generated PBL to the processor 220 via the system bus 210 and local bus 226. The processor 220 may then utilize the PBL to identify a plurality of referenced splicing STags, which identify physical memory locations within one or more auxiliary servers 110a, 110b and/or 110c. The processor 220 may generate RDMA read requests based on the STags, which may be sent to the appropriate auxiliary servers, to retrieve the corresponding data stripes. The processor 220 may send each RDMA request to the appropriate auxiliary servers to the network interface 224 via the local bus 226. The network interface 224 may then send the received RDMA read requests via the network 102.

The network interface 224 may receive DDP segments sent by the auxiliary servers 110a, 110b and/or 110c in response to the RDMA read requests via the network 102. The network interface 224 may send each DDP segment to the processor 220 via the local bus 226. The processor 220 may utilize data contained within the DDP segment to generate data, which may be utilized to generate a sequence numbered TCP packet, for example TCP header information comprising a source and/or destination address and segment sequence number. The processor 220 may send data contained within the received DDP segment along with generated TCP data to the TOE 228 via the local bus 226. The TOE 228 may generate the sequence numbered TCP packet, which may be sent to the network interface 224 via the local bus 226. The network interface may send the TCP packet to the client 104 via the network 102.

Thus, in various embodiments of the invention, the processor 206 within the main server 202 may receive read requests from the client 104. The processor 206 may translate a data reference contained in each read request to generate a physical buffer list (PBL). The processor 206 may communicate the PBL to the processor 220 within the NIC 204. The processor 220 may utilize the PBL perform RDMA operations to retrieve data stripes contained in one or more DDP segments received from the auxiliary servers 110a, 110b and/or 110c. The processor 220 may enable the generation of TCP packets each containing one or more DDP segments, which may then be sent to the client 104. In various embodiments of the invention, the retrieval of DDP segments and generation of TCP packets may occur within the NIC 204 without transferring retrieved data via the system bus 210. Thus, bandwidth on the system bus 210 may be made available for other tasks and/or applications executing on the processor 206, for example.

Figure 3:
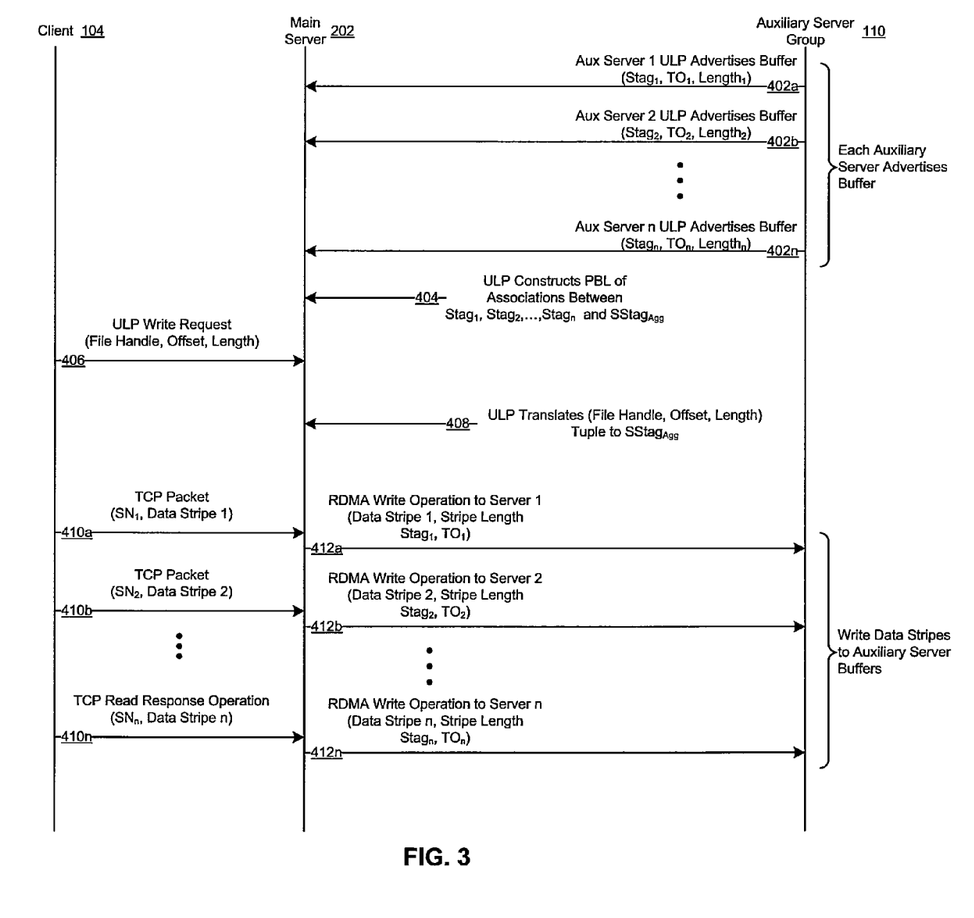
FIG. 3 is a flowchart illustrating exemplary message flows for a client write operation in an RDMA-aware system, in accordance with an embodiment of the invention.

FIG. 3 is a flowchart illustrating exemplary message flows for a client write operation in an RDMA-aware system, in accordance with an embodiment of the invention. FIG. 3 illustrates message exchanges between a client 104, a main server 108, and an auxiliary server group 110. The auxiliary server group may comprise a plurality of auxiliary servers, auxiliary server 110a, auxiliary server 110b, . . . , and auxiliary server n, where n may be a number indicating a number of auxiliary servers in the auxiliary server group, for example auxiliary server 110c when n=3. Each auxiliary server may comprise physical memory resources, which may be utilized for storage and/or retrieval of files and/or data. A storage area network (SAN) device may comprise the auxiliary sever group, and/or the main server 202.

Referring to FIG. 3, in step 402a, an auxiliary server 110a may advertise a buffer. The buffer advertisement may be contained in a ULP message, which may be sent from the auxiliary server 110a, to the main server 202. The buffer may represent physical memory resources within the auxiliary server 110a, which may be utilized for storage of files and/or data. The ULP message may also comprise a steering tag, $STag_1$, a buffer offset $TO_1$, and a length, $Length_1$. The steering tag $STag_1$ may reference the buffer within the auxiliary server 110a. The buffer offset, $TO_1$, may be utilized in conjunction with the steering tag, $STag_1$, to reference a physical memory address within the buffer. The length, $Length_1$, may indicate a quantity of physical memory resources, as measured in bytes for example, that are allocated for the buffer.

In step 402b, an auxiliary server 110b may advertise a buffer, which represents physical memory resources within the auxiliary server 110b. The buffer advertisement may be contained in a ULP message, which may be sent from the auxiliary server 110b, to the main server 202. The ULP message may also comprise a steering tag, $STag_2$, a buffer offset $TO_2$, and a length, $Length_2$.

In step 402n, an auxiliary server n, for example auxiliary server 110c, may advertise a buffer, which represents physical memory resources within the auxiliary server n. The buffer advertisement may be contained in a ULP message, which may be sent from the auxiliary server n, to the main server 202. The ULP message may also comprise a steering tag, $STag_n$, a buffer offset $TO_n$, and a length, $Length_n$.

In step 404, the ULP executing within the processor 206 in the main server 202 may construct a physical buffer list (PBL). The processor 206 may utilize the buffer advertisements, received in steps 402a, 402b, . . . , and 402n, to construct an aggregated buffer. The processor 206 may construct a PBL, which associates the individual buffers from the auxiliary server 110a, auxiliary server 110b, . . . , and auxiliary server n, with the aggregated buffer. The aggregated buffer may be associated with an aggregated STag, $SSTag_{Agg}$, an aggregated buffer offset $TO_{Agg}$, and an aggregated length, $Length_{Agg}$. The aggregated buffer may represent logical memory resources, which represent an aggregate of physical memory resources located in the auxiliary server 110a, auxiliary server 110b, . . . , and auxiliary server n. The aggregated STag, $SSTag_{Agg}$, may be associated with the individual steering tags, $STag_1$, $STag_2$, . . . , and $STag_n$. The aggregated length may be represented, $Length_{Agg}=Length_1+Length_2+ \ldots +Length_n$.

Based on the value of the aggregated buffer offset, $TO_{Agg}$, an indicated location within the aggregated buffer may reference physical memory resources within the auxiliary server 110a, auxiliary server 110b, . . . , and/or auxiliary server n. For example, for a value $TO_{Agg}=TO_{Agg1}$, the indicated location within the aggregated buffer may reference physical memory resources within the auxiliary server 110a. For a value $TO_{Agg}=TO_{Agg2}$, the indicated location within the aggregated buffer may reference physical memory resources within the auxiliary server 110b, for example. Similarly, for a value $TO_{Agg}=TO_{Aggn}$, the indicated location within the aggregated buffer may reference physical memory resources within the auxiliary server n, for example auxiliary server 110c. The PBL may comprise information, which represents the relationships between the aggregated buffer and each of the buffers that represent physical memory resources.

In step 406, the client 104 may send a write request to the main server 202 to request that a file be stored within an SAN device, for example. The message sent by the client 104 may originate in a ULP executing at the client 104 and may comprise a file handle, file offset, and length, as may be utilized in a file descriptor for the file in a UNIX operating system function call, for example.

In step 408, the processor 206 may translate the file handle, file offset, and length tuple to an aggregated splitting STag, $SSTag_{Agg}$. The association between the aggregated splitting STag and the file tuple may enable the main server 202 to receive packets comprising data from the from the client 104, which may each be translated to generate one or more DDP segments that may be sent from the main server 202 to a referenced auxiliary server in the auxiliary server group 110. The referenced auxiliary server may store the data contained in a received DDP segment. The data contained in the received DDP segment may comprise at least a portion of the data contained in the file sent from the client 104.

In steps 410, the client 104 may send data, contained within the file, to the main server 202. The client 104 may send one or more sequence numbered packets, each of which may contain a portion of the data within the file. In step 410a, the client 104 may send a sequence numbered, $SN_1$, packet to the main server 202. The $SN_1$ packet may comprise a data stripe 1, where the data stripe 1 may comprise a portion of the data contained within the file. In step 410b, the client 104 may send a sequence numbered, $SN_2$, packet to the main server 202. The $SN_2$ packet may comprise a data stripe 2, where the data stripe 2 may comprise a succeeding portion of the data contained within the file to the portion contained in data stripe 1. In step 410c, the client 104 may send a sequence numbered, $SN_n$, packet to the main server 202. The $SN_n$ packet may comprise a data stripe n, where the data stripe n may comprise a final portion of the data contained within the file.

In steps 412, the processor 206 may utilize the splitting STag associated with the file tuple contained in a received packet, $SSTag_{agg}$, to reference a PBL. The processor 206 may communicate the PBL to the processor 220 within the NIC 204. The processor 220 may utilize the sequence number in each of the sequence numbered packets from steps 410 to generate an offset value, $TO_{Agg}$, that may enable the main server 202 to forward individual data stripes received from the client 104 for storage in an auxiliary server within the auxiliary server group 110 comprising an auxiliary server 110a, auxiliary server 110b, . . . , and auxiliary server n.

The processor 220 may utilize the PBL and to locate physical memory resources within the auxiliary server 110a, auxiliary server 110b, . . . , and/or auxiliary server n, which may be utilized for storage of at least a portion of the data, in connection with the write request received from the client 104. In step 412a, the processor 220 may perform an RDMA write operation by sending a message to the auxiliary server 110a. The message sent by the processor 220 to the auxiliary server 110a may comprise the steering tag, $STag_1$, and buffer offset $TO_1$, for example, which may reference physical memory resources within the auxiliary server 110a. The message may also comprise the data stripe 1, and a stripe length. The data stripe 1 may comprise the data stripe 1 sent by the client 104 in the $SN_1$ packet in step 410a. The stripe length may represent a length, as measured in bytes for example, of the data stripe 1. Upon receipt of the write operation message from the main server 202, the auxiliary server 110a may store the data stripe 1 within physical memory resources at a location indicated by the steering tag, $STag_1$, and the buffer offset $TO_1$, for example.

In step 412a, the processor 220 may perform an RDMA write operation by sending a message to the auxiliary server 110b. The message sent by the processor 220 to the auxiliary server 110b may comprise the steering tag, $STag_2$, and buffer offset $TO_2$, for example, which may reference physical memory resources within the auxiliary server 110b. The message may also comprise the data stripe 2, and a stripe length. The data stripe 2 may comprise the data stripe 2 sent by the client 104 in the $SN_2$ packet in step 410b. The stripe length may represent a length, as measured in bytes for example, of the data stripe 2. Upon receipt of the write operation message from the main server 202, the auxiliary server 110b may store the data stripe 2 within physical memory resources at a location indicated by the steering tag, $STag_2$, and the buffer offset $TO_2$, for example.

In step 412n, the processor 220 may perform an RDMA write operation by sending a message to the auxiliary server n. The message sent by the processor 220 to the auxiliary server n may comprise the steering tag, $STag_n$, and buffer offset $TO_n$, for example, which may reference physical memory resources within the auxiliary server n. The message may also comprise the data stripe n, and a stripe length. The data stripe n may comprise the data stripe n sent by the client 104 in the $SN_n$ packet in step 410n. The stripe length may represent a length, as measured in bytes for example, of the data stripe n. Upon receipt of the write operation message from the main server 202, the auxiliary server n may store the data stripe n within physical memory resources at a location indicated by the steering tag, $STag_n$, and the buffer offset $TO_n$, for example.

Figure 4:
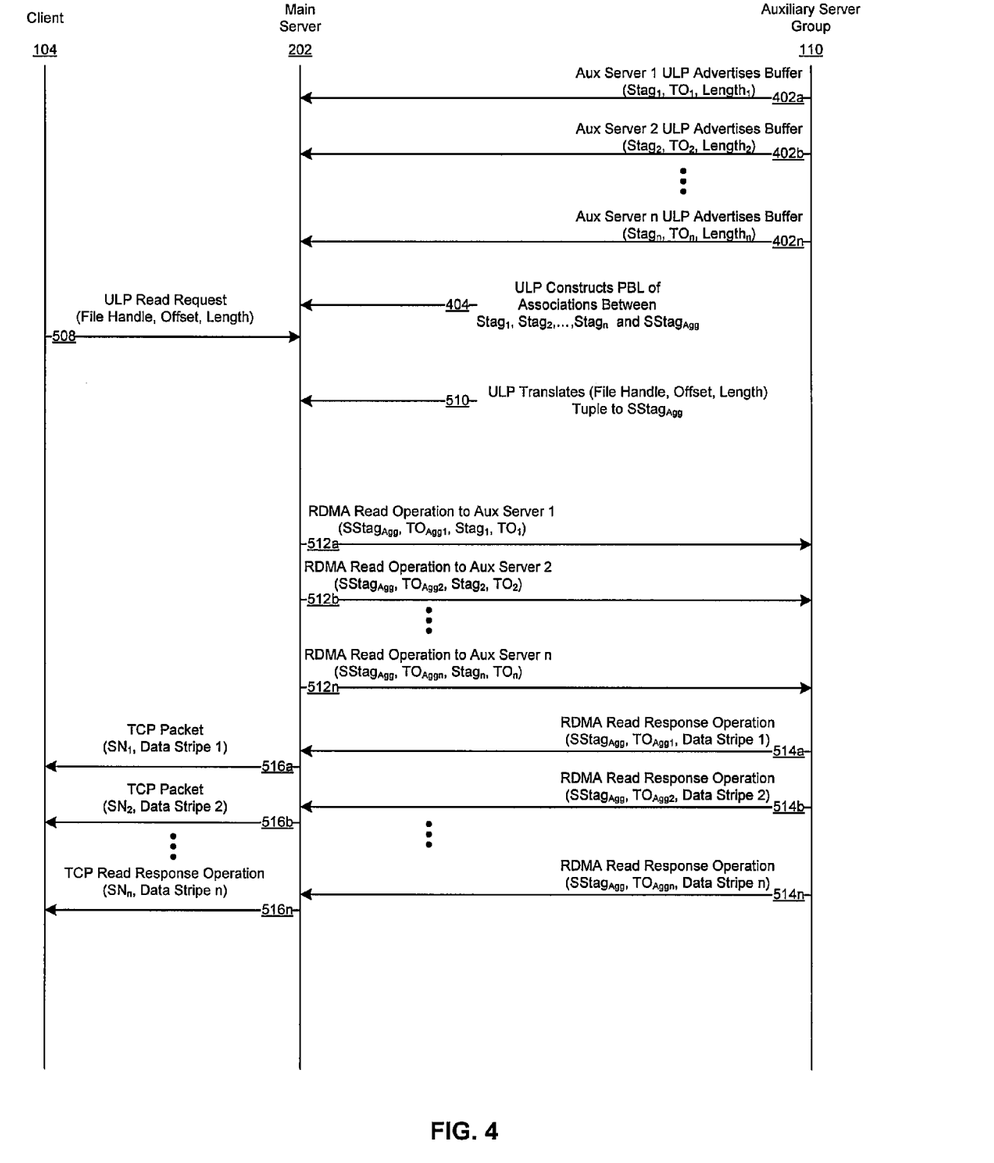
FIG. 4 is a flowchart illustrating exemplary message flows for a client read operation in an RDMA-aware system, in accordance with an embodiment of the invention.

FIG. 4 is a flowchart illustrating exemplary message flows for a client read operation in an RDMA-aware system, in accordance with an embodiment of the invention. Referring to FIG. 4, in step 402a an auxiliary server 110a may advertise a buffer, as described in FIG. 3. In step 402b an auxiliary server 110b may advertise a buffer, as described in FIG. 3. In step 402n an auxiliary server n, for example auxiliary server 110c, may advertise a buffer, as described in FIG. 3. In step 404, the processor 206 may construct a physical buffer list (PBL), as described in FIG. 3.

In step 508, the client 104 may send a read request to the main server 202 to request that a file be retrieved from an SAN device, for example. The message sent by the client 104 may originate in a ULP executing at the client 104 and may comprise a file handle, file offset, and length. In step 510, the processor 206 may translate the file handle, file offset, and length tuple to correspond to an aggregated splicing STag, $SSTag_{Agg}$. The association between the aggregated splicing STag and the tuple may enable the processor 220 to receive a DDP segment from an auxiliary server in the auxiliary server group 110, and generate a sequence numbered packet that may be sent from the main server 202 to the client 104. The data contained in each DDP segment and corresponding sequenced numbered packet may comprise a portion of the data contained in the requested file.

In steps 512, the processor 220 may utilize the splicing STag to initiate a plurality of RDMA read operations to retrieve individual data stripes from the auxiliary server group 110. In step 512a, the processor 220 may perform an RDMA read operation by sending a message to the auxiliary server 110a. The message sent by the processor 220 to the auxiliary server 110a may comprise a data source location from which the data stripe 1 is to be retrieved, and a data destination location to which the retrieved data stripe 1 is to be stored. The data destination location for the data may refer to a buffer within the aggregated buffer, which may be represented by the splicing STag, $SSTag_{Agg}$, and a buffer offset, $TO_{Agg1}$. The data source location for the data may refer to the buffer within the auxiliary server 110a, which may be represented by $STag_1$, and buffer offset, $TO_1$.

In step 512b, the processor 220 may perform an RDMA read operation by sending a message to the auxiliary server 110b. The message sent by the processor 220 to the auxiliary server 110b may comprise a data source location from which the data stripe 2 is to be retrieved, and a data destination location to which the retrieved data stripe 2 is to be stored. The data destination location for the data may refer to a buffer within the aggregated buffer, which may be represented by the splicing STag, $SSTag_{Agg}$, and a buffer offset, $TO_{Agg2}$. The data source location for the data may refer to the buffer within the auxiliary server 110b, which may be represented by $STag_2$, and buffer offset, $TO_2$.

In step 512n, the processor 220 may perform an RDMA read operation by sending a message to the auxiliary server n, for example the auxiliary server 110c. The message sent by the processor 220 to the auxiliary server n may comprise a data source location from which the data stripe n is to be retrieved, and a data destination location to which the retrieved data stripe n is to be stored. The data destination location for the data may refer to a buffer within the aggregated buffer, which may be represented by the splicing STag, $SSTag_{Agg}$, and a buffer offset, $TO_{Aggn}$. The data source location for the data may refer to the buffer within the auxiliary server n, which may be represented by $STag_n$, and buffer offset, $TO_n$.

Upon receipt of the read operation message from the main server 202 in step 512a, the auxiliary server 110a may retrieve the data stripe 1 from physical memory resources at a location indicated by the steering tag, $STag_1$, and the buffer offset $TO_1$. In step 514a, the auxiliary server 110a may perform an RDMA read response operation by sending a message to the main server 202. The message sent by the auxiliary server 110a to the main server 202 may comprise the data stripe 1, and the data destination location information received in step 512a.

Upon receipt of the read response operation from the auxiliary server 110a, the processor 220 may reference the PBL, based on the $SSTag_{Agg}$, and $TO_{Agg1}$, The processor 220 may utilize the PBL reference to generate a sequence numbered packet to be sent to the client 104. In step 516a, the NIC 204 within the main server 202 may send a sequence numbered packet $SN_1$ to the client 104. The packet sent by the NIC 204 to the client 104 may comprise the data stripe 1, and the packet sequence number $SN_1$.

Upon receipt of the read operation message from the main server 202 in step 512b, the auxiliary server 110b may retrieve the data stripe 2 from physical memory resources at a location indicated by the steering tag, $STag_2$, and the buffer offset $TO_2$. In step 514b, the auxiliary server 110b may perform an RDMA read response operation by sending a message to the main server 202. The message sent by the auxiliary server 110b to the main server 202 may comprise the data stripe 2, and the data destination location information received in step 512b.

Upon receipt of the read response operation from the auxiliary server 110b, the processor 220 may reference the PBL, based on the $SSTag_{Agg}$, and $TO_{Agg2}$. The processor 220 may utilize the PBL reference to generate a sequence numbered packet to be sent to the client 104. In step 516b, the NIC 204 within the main server 202 may send a sequence numbered packet $SN_2$ to the client 104. The packet sent by the NIC 204 to the client 104 may comprise the data stripe 2, and the packet sequence number $SN_2$.

Upon receipt of the read operation message from the main server 202 in step 512n, the auxiliary server n may retrieve the data stripe n from physical memory resources at a location indicated by the steering tag, $STag_n$, and the buffer offset $TO_n$. In step 514n, the auxiliary server n may perform an RDMA read response operation by sending a message to the main server 202. The message sent by the auxiliary server n to the main server 202 may comprise the data stripe n, and the data destination location information received in step 512n.

Upon receipt of the read response operation from the auxiliary server n, the processor 220 may reference the PBL, based on the $SSTag_{Agg}$, and $TO_{Aggn}$. The processor 220 may utilize the PBL reference to generate a sequence numbered packet to be sent to the client 104. In step 516n, the NIC 204 within the main server 202 may send a sequence numbered packet $SN_n$ to the client 104. The message sent by the NIC 204 to the client 104 may comprise the data stripe n, and the packet sequence number $SN_n$.

Aspects of a method and system for splicing RDMA transactions in an RDMA-aware system may comprise receiving, at a network interface controller (NIC), a read request message that specifies data comprising at least one data stripe, generating, within the NIC, at least one address for retrieval of the at least one data stripe, receiving, at the NIC, at least a portion of the at least one data stripe within at least one DDP segment based on the generated at least one address and transmitting, from the NIC, the received at least a portion of the at least one data stripe within at least one packet. The read request comprises a file handle, file offset value and/or file length that identifies the at least one data stripe. An aggregated splicing steering tag (Stag) and/or an aggregated tagged offset (TO) value may be selected based on the file handle and/or the file offset value. The packet may be generated based on the aggregated splicing Stag, at least one aggregated TO index, the file handle, the file offset value and/or the file length.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for transferring data in a communications system, the method comprising:

receiving, at a network interface controller (NIC), a read request message that specifies data comprising at least one data stripe;

selecting based on said received read request, at least one splicing steering tag from an aggregated splicing steering tag, wherein said aggregated splicing steering tag comprises a plurality of splicing steering tags, and each of said plurality of splicing steering tags is associated with a respective one of a plurality of external auxiliary storage devices for use in storing data accessed via said NIC;

generating, within said NIC and based on said selected at least one splicing steering tag, at least one address for retrieval of said at least one data stripe, wherein said at least one address is associated with at least one of said plurality of external auxiliary storage devices;

receiving, at said NIC, at least a portion of said at least one data stripe within at least one direct data placement (DDP) segment based on said generated at least one address; and transmitting, from said NIC, said received at least a portion of said at least one data stripe within at least one packet.

2. The method according to claim 1, wherein said read request comprises a file handle, file offset value and/or file length that identifies said at least one data stripe.

3. The method according to claim 2, comprising selecting said aggregated splicing steering tag (STag) and/or an aggregated tagged offset (TO) value based on said file handle and/or said file offset value.

4. The method according to claim 3, comprising selecting a physical buffer list (PBL) based on said aggregated splicing Stag and/or said aggregated TO value.

5. The method according to claim 4, comprising generating at least one data stripe STag and/or at least one data stripe TO based on said PBL.

6. The method according to claim 5, comprising generating said at least one address based on said generated at least one data stripe STag and/or said generated at least one data stripe TO.

7. The method according to claim 3, comprising generating said packet based on said aggregated splicing STag, at least one aggregated TO index, said file handle, said file offset value and/or said file length.

8. The method according to claim 7, comprising generating said at least one aggregated TO index based on a PBL.

9. The method according to claim 1, comprising transmitting at least one DDP read request message corresponding to said generated at least one address.

10. The method according to claim 9, comprising receiving said at least one DDP segment in response to at least a portion of said transmitted at least one DDP read request message.

11. A non-transitory computer readable medium having stored thereon, a computer program having at least one code section for transferring data in a communications system, the at least one code section being executable by a computer for causing the computer to perform steps comprising:

receiving, at a network interface controller (NIC), a read request message that specifies data comprising at least one data stripe;

selecting based on said received read request, at least one splicing steering tag from an aggregated splicing steering tag, wherein said aggregated splicing steering tag comprises a plurality of splicing steering tags, and each of said plurality of splicing steering tags is associated with a respective one of a plurality of external auxiliary storage devices for use in storing data accessed via said NIC;

generating, within said NIC and based on said selected at least one splicing steering tag, at least one address for retrieval of said at least one data stripe, wherein said at least one address is associated with at least one of said plurality of external auxiliary storage devices;

receiving, at said NIC, at least a portion of said at least one data stripe within at least one direct data placement (DDP) segment based on said generated at least one address; and transmitting, from said NIC, said received at least a portion of said at least one data stripe within at least one packet.

12. The non-transitory computer readable medium according to claim 11, wherein said read request comprises a file handle, file offset value and/or file length that identifies said at least one data stripe.

13. The non-transitory computer readable medium according to claim 12, comprising code for selecting said aggregated splicing steering tag (STag) and/or an aggregated tagged offset (TO) value based on said file handle and/or said file offset value.

14. The non-transitory computer readable medium according to claim 13, comprising code for selecting a physical buffer list (PBL) based on said aggregated splicing Stag and/or said aggregated TO value.

15. The non-transitory computer readable medium according to claim 14, comprising code for generating at least one data stripe STag and/or at least one data stripe TO based on said PBL.

16. The non-transitory computer readable medium according to claim 15, comprising code for generating said at least one address based on said generated at least one data stripe STag and/or said generated at least one data stripe TO.

17. The non-transitory computer readable medium according to claim 13, comprising code for generating said packet based on said aggregated splicing STag, at least one aggregated TO index, said file handle, said file offset value and/or said file length.

18. The non-transitory computer readable medium according to claim 17, comprising code for generating said at least one aggregated TO index based on a PBL.

19. The non-transitory computer readable medium according to claim 11, comprising code for transmitting at least one DDP read request message corresponding to said generated at least one address.

20. The non-transitory computer readable medium according to claim 19, comprising code for receiving said at least one DDP segment in response to at least a portion of said transmitted at least one DDP read request message.

21. A system for transferring data in a communications system, the system comprising:

at least one processor that enables reception, at a network interface controller (NIC), of a read request message that specifies data comprising at least one data stripe;

said at least one processor that enables selection of based on said received read request, at least one splicing steering tag from an aggregated splicing steering tag, wherein said aggregated splicing steering tag comprises a plurality of splicing steering tags, and each of said plurality of splicing steering tags is associated with a respective one of a plurality of external auxiliary storage devices for use in storing data accessed via said NIC;

said at least one processor enables generation, within said NIC and based on said selected at least one splicing steering tag, of at least one address for retrieval of said at least one data stripe, wherein said at least one address is associated with at least one of said plurality of external auxiliary storage devices;

said at least one processor enables reception, at said NIC, of at least a portion of said at least one data stripe within at least one direct data placement (DDP) segment based on said generated at least one address; and said at least one processor enables transmission, from said NIC, of said received at least a portion of said at least one data stripe within at least one packet.

22. The system according to claim 21, wherein said read request comprises a file handle, file offset value and/or file length that identifies said at least one data stripe.

23. The system according to claim 22, wherein said at least one processor enables selection of said aggregated splicing steering tag (STag) and/or an aggregated tagged offset (TO) value based on said file handle and/or said file offset value.

24. The system according to claim 23, wherein said at least one processor enables selection of a physical buffer list (PBL) based on said aggregated splicing Stag and/or said aggregated TO value.

25. The system according to claim 24, wherein said at least one processor enables generation of at least one data stripe STag and/or at least one data stripe TO based on said PBL.

26. The system according to claim 25, wherein said at least one processor enables generation of said at least one address based on said generated at least one data stripe STag and/or said generated at least one data stripe TO.

27. The system according to claim 23, wherein said at least one processor enables generation of said packet based on said aggregated splicing STag, at least one aggregated TO index, said file handle, said file offset value and/or said file length.

28. The system according to claim 27, wherein said at least one processor enables generation of said at least one aggregated TO index based on a PBL.

29. The system according to claim 21, wherein said at least one processor enables transmission of at least one DDP read request message corresponding to said generated at least one address.

30. The system according to claim 29, wherein said at least one processor enables reception of said at least one DDP segment in response to at least a portion of said transmitted at least one DDP read request message.

31. A method for transferring data in a communications system, the method comprising:

receiving, at a network interface controller (NIC), a read request message that specifies data comprising at least one data stripe, wherein said read request comprises a file handle, file offset value and/or file length that identifies said at least one data stripe;

selecting based on said received read request, at least one splicing steering tag from an aggregated splicing steering tag, wherein said aggregated splicing steering tag comprises a plurality of splicing steering tags;

generating, within said NIC and based on said selected at least one splicing steering tag, at least one address for retrieval of said at least one data stripe;

receiving, at said NIC, at least a portion of said at least one data stripe within at least one direct data placement (DDP) segment based on said generated at least one address;

transmitting, from said NIC, said received at least a portion of said at least one data stripe within at least one packet;

selecting said aggregated splicing steering tag (STag) and/or an aggregated tagged offset (TO) value based on said file handle and/or said file offset value;

generating said packet based on said aggregated splicing STag, at least one aggregated TO index, said file handle, said file offset value and/or said file length; and generating said at least one aggregated TO index based on a PBL.

32. A non-transitory computer readable medium having stored thereon, a computer program having at least one code section for transferring data in a communications system, the at least one code section being executable by a computer for causing the computer to perform steps comprising:

receiving, at a network interface controller (NIC), a read request message that specifies data comprising at least one data stripe, wherein said read request comprises a file handle, file offset value and/or file length that identifies said at least one data stripe;

selecting based on said received read request, at least one splicing steering tag from an aggregated splicing steering tag, wherein said aggregated splicing steering tag comprises a plurality of splicing steering tags;

generating, within said NIC and based on said selected at least one splicing steering tag, at least one address for retrieval of said at least one data stripe;

receiving, at said NIC, at least a portion of said at least one data stripe within at least one direct data placement (DDP) segment based on said generated at least one address;

transmitting, from said NIC, said received at least a portion of said at least one data stripe within at least one packet;

selecting said aggregated splicing steering tag (STag) and/or an aggregated tagged offset (TO) value based on said file handle and/or said file offset value;

generating said packet based on said aggregated splicing STag, at least one aggregated TO index, said file handle, said file offset value and/or said file length; and generating said at least one aggregated TO index based on a PBL.

33. A system for transferring data in a communications system, the system comprising:

at least one processor that enables reception, at a network interface controller (NIC), of a read request message that specifies data comprising at least one data stripe, wherein said read request comprises a file handle, file offset value and/or file length that identifies said at least one data stripe;

said at least one processor enables selection of based on said received read request, at least one splicing steering tag from an aggregated splicing steering tag, wherein said aggregated splicing steering tag comprises a plurality of splicing steering tags;

said at least one processor enables generation, within said NIC and based on said selected at least one splicing steering tag, of at least one address for retrieval of said at least one data stripe;

said at least one processor enables reception, at said NIC, of at least a portion of said at least one data stripe within at least one direct data placement (DDP) segment based on said generated at least one address;

said at least one processor enables transmission, from said NIC, of said received at least a portion of said at least one data stripe within at least one packet;

said at least one processor enables selection of said aggregated splicing steering tag (STag) and/or an aggregated tagged offset (TO) value based on said file handle and/or said file offset value;

said at least one processor enables generation of said packet based on said aggregated splicing STag, at least one aggregated TO index, said file handle, said file offset value and/or said file length; and said at least one processor enables generation of said at least one aggregated TO index based on a PBL.

* * * * *

UNITED STATES PATENT AND TRADEMARK OFFICE
CERTIFICATE OF CORRECTION

PATENT NO. : 8,090,790 B2
APPLICATION NO. : 11/941275
DATED : January 3, 2012
INVENTOR(S) : Bestler It is certified that error appears in the above-identified patent and that said Letters Patent is hereby corrected as shown below:

Column 18, Line 17, please remove "that"

Signed and Sealed this
Twenty-fourth Day of April, 2012

David J. Kappos
*Director of the United States Patent and Trademark Office*